(12) United States Patent
Takaoka et al.

(10) Patent No.: US 6,703,113 B2
(45) Date of Patent: Mar. 9, 2004

(54) PB-FREE SOLDER COMPOSITION AND SOLDERED ARTICLE

(75) Inventors: Hidekiyo Takaoka, Kusatsu (JP); Kunihiko Hamada, Moriyama (JP)

(73) Assignee: Murata Manufacturing Co. Ltd (JP)

( * ) Notice: Subject to any disclaimer, the term of this patent is extended or adjusted under 35 U.S.C. 154(b) by 28 days.

(21) Appl. No.: 09/878,818

(22) Filed: Jun. 11, 2001

(65) Prior Publication Data

US 2002/0012608 A1 Jan. 31, 2002

(30) Foreign Application Priority Data

Jun. 12, 2000 (JP) .......................... 2000-175757

(51) Int. Cl.$^7$ ............................................ B32B 15/00
(52) U.S. Cl. ................... 428/209; 428/432; 428/433; 148/24; 420/577
(58) Field of Search ............... 420/577; 228/245–262; 428/209, 432, 433

(56) References Cited

U.S. PATENT DOCUMENTS

| | | | | | |
|---|---|---|---|---|---|
| 2,117,282 A | * | 5/1938 | Austin | .................. | 420/577 |
| 3,045,341 A | * | 7/1962 | Kolenko et al. | ........ | 228/262.61 |
| 6,123,248 A | * | 9/2000 | Tadauchi et al. | ......... | 228/111.5 |
| 6,367,683 B1 | * | 4/2002 | Rass et al. | .................. | 228/121 |

FOREIGN PATENT DOCUMENTS

JP  11-320177  * 11/1999

OTHER PUBLICATIONS

*Constitution of Binary Alloys*, Dr. phil. Max Hansen, Second Edition, 1958; pp. 10–11.

* cited by examiner

*Primary Examiner*—Deborah Jones
*Assistant Examiner*—G. A. Blackwell-Rudasill
(74) *Attorney, Agent, or Firm*—Dickstein, Shapiro, Morin & Oshinsky, LLP.

(57) ABSTRACT

Provided is a Pb-free solder composition having an excellent heat resistance which does not damage a glass substrate and parts on the substrate when the soldering is carried out on to an electrode pattern formed on the substrate. The Pb-free solder composition contains, for example, not less than about 90% by weight of Bi, from about 0.1% to 9.9% by weight of Ag and from about 0.1% to 3.0% by weight of Sb, based on the whole solder composition.

18 Claims, 1 Drawing Sheet

PB-FREE SOLDER COMPOSITION AND SOLDERED ARTICLE

BACKGROUND OF THE INVENTION

1. Field of the Invention

The present invention relates to a solder composition substantially free from Pb and a soldered article therewith. Particularly, the present invention relates to a Pb-free solder composition suitable for soldering a conductor formed on a brittle substrate, and to a soldered article such as a soldered substrate therewith.

2. Description of the Related Art

When soldering is conventionally carried out onto a conductor formed on a glass substrate, a Sn—Pb type solder composition having a low tensile modulus is generally used. However, since the conventional Sn—Pb type eutectic solder composition contains poisonous Pb, there have been an increasing number of cases in which the use is restricted.

Recently, a Pb-free solder composition mainly composed of Sn has also been used in consideration of the burden on the environments. However, when the soldering with the composition is carried out on to a conductor formed on a fragile substrate such as a glass substrate, a thermal stress generated in the course of the soldering will sometimes damage the substrate. This problem is caused by the fact that the solder usually has a large tensile modulus.

Furthermore, a higher and higher heat-resistant temperature has been required for a soldered article in recent years. For example, when the conventional Sn—Pb eutectic solder composition or the Pb-free solder composition mainly composed of Sn is applied for soldering an article and the soldered article is exposed to a high temperature, the solder composition is melted, incurring solder flowing, coming-off of terminals, electrode erosion, disconnection, etc. These are problems of so-called solder heat resistance-related defects (that is, defects related to the heat resistance of a solder).

SUMMARY OF THE INVENTION

Accordingly, it is an object of the present invention to solve such problems, to provide a Pb-free solder composition with which damage on a fragile substrate such as a glass substrate can be restricted when the soldering with the composition is carried out on to a conductor formed on the substrate and which has an excellent heat resistance, and to provide a soldered article therewith.

In order to attain the above-described purposes, one aspect of the present invention is a Pb-free solder composition comprising: Bi as a first metallic element; a second metallic element which can form a binary eutectic at a ratio of not more than about 9.9 parts by weight of the second metallic element based on not less than about 90 parts by weight of the above-described first metallic element; and a third metallic element, wherein the first metallic element is not less than about 90% by weight, and the third metallic element is from about 0.1% to 3.0% by weight, both based on the whole solder composition.

In the Pb-free solder composition according to the present invention, it is especially preferable that the first metallic element is not less than about 94.5% by weight, and the second metallic element is from about 0.15% to 3.0% by weight of the whole solder composition.

Furthermore, it is preferable that the Pb-free solder composition according to the present invention does not contain a low melting-point eutectic with a solidus temperature of less than about 200° C.

Furthermore, the third metallic element in the Pb-free solder composition according to the present invention is preferably at least one element selected from the group consisting of Sn, Cu, In, Sb and Zn.

Furthermore, it is preferable that the second metallic element is at least one element selected from the group consisting of Ag, Cu and Zn. It is more preferable that the second metallic element is from about 0.1% to 9.9% by weight of the above-described whole solder composition.

In the Pb-free solder composition according to the present invention, it is especially preferable that the above-described second metallic element is Ag, the above-described third metallic element comprises at least one selected from the group consisting of from about 0.1% to 0.5% by weight of Sn, from about 0.1% to 0.3% by weight of Cu, from about 0.1% to 0.5% by weight of In, from about 0.1% to 3.0% by weight of Sb, and from about 0.1% to 3.0% by weight of Zn, based on the whole solder composition.

Furthermore, in the Pb-free solder composition according to the present invention, it is preferable that the above-described third metallic element further comprises at least one element selected from the group consisting of Ge and P, and that this additional third metallic element is from about 0.01% to 0.1% by weight of the whole solder composition.

Another aspect of the present invention provides a Pb-free soldered article comprising: a substrate having a conductive pattern on the surface; and a Pb-free solder composition according to the present invention placed so as to be electrically and mechanically connected to the conductive pattern.

The above-described substrate may be a glass substrate having an electrode pattern on its surface, wherein a lead wire is connected to the electrode via the above-described Pb-free solder composition.

DESCRIPTION OF THE PREFERRED EMBODIMENTS

Figure 1:
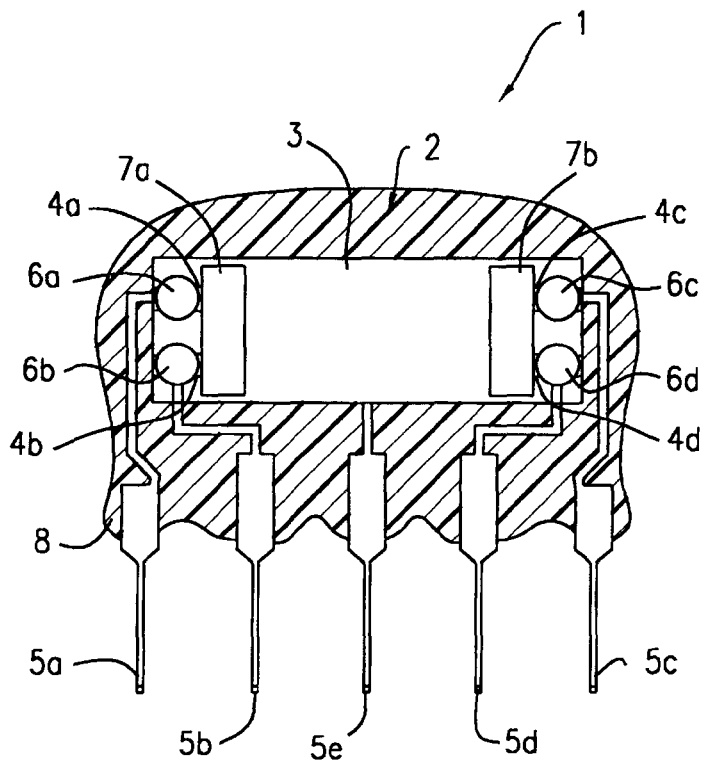
FIGS. 1 and 2 are a cross-sectional view showing a soldered article described in an embodiment according to the present invention.

When a lead wire is bonded to an electrode pattern formed on a glass substrate by means of soldering, cracks often appear on the glass substrate. As a result of investigations undertaken based on the idea that damages such as the cracks would be generated by the thermal stress caused by the disagreement of the coefficients of thermal expansion, etc. between the glass substrate and the solder composition, it was found especially effective for reducing the damage to relax the thermal stress during the solidification of the solder.

One example of measures to relax the thermal stress during the solidification of the solder is to select an alloy composition which does not show shrinkage during the solidification. Specifically, metallic elements which show volume expansion during the solidification were selected as members for an alloy composition which do not show shrinkage during the solidification. As elements which show volume expansion during the solidification, enumerated are Bi and Ga. However, Ga is a rare metal, may be difficult to secure a stable supply, and is expensive. Accordingly, it is not appropriate as a chemical element for the main component of a solder composition.

Therefore, Bi was selected as a chemical element for the main component of a solder composition. A Bi—Ag (2.5% by weight) solder composition was regarded as promising in consideration of the melting point, workability, etc. According to "CONSTITUTION OF BINARY ALLOYS (HANSEN×McGRAW-HILL BOOK COMPANY, INC, 1958)", it is believed that the Bi—Ag alloy has a eutectic composition at 2.5% by weight of Ag. As the solder composition at the eutectic composition is a stable metallic composition, it has an outstanding mechanical strength.

Based on the above-described reason, a Pb-free solder composition according to the present invention is composed of Bi which shows volume expansion at the solidification as a main component (a first metallic element), and of a second metallic element which can form a eutectic with Bi. That is, it is required that the second metallic element is a metallic element which can form a binary eutectic at a ratio of not more than about 9.9 parts by weight of the element based on not less than about 90 parts by weight of Bi.

As the second metallic element, an element selected from the group consisting of Ag, Cu, Zn, etc. may be used as appropriate, for example. Ag is preferable among these as the second metallic element. More preferably, the content of the second metallic element is from about 0.1% to 9.9% by weight of the whole solder composition. The especially preferable content is about 2.5% by weight.

However, with the solder composition at a eutectic composition, expansion stress is exerted at once at the time of solidification. For solving the problem, it was tried, for example, to have the Bi—Ag (2.5% by weight) alloy further comprise a small amount of a third metallic element in order to have a solid-liquid coexisting region in the expansion profile, and thus to avoid the behavior of sudden expansion stress exertion at the time of solidification.

When the content of the third metallic element is increased, Bi (the first metallic element) and the third metallic element form a low melting point eutectic with an extremely low solidus temperature. This will result in a lowered solder heat resistance (heat resistance of a solder) and will possibly incur various problems such as solder flowing and coming-off terminals. Furthermore, there is a tendency that the liquidus temperature is raised to an extreme extent. This may cause more bridging defects, poorer appearance and poorer solderability, when soldering is carried out at the same temperature as that applied to the solder having a smaller amount of the third metallic element. When a higher temperature is selected for the soldering to avoid this problem, the high temperature may damage the properties of electronic parts, etc. Therefore, it is necessary that the content of the third metallic element is from about 0.1% to 3.0% by weight of the whole solder composition.

There is no specific limitation of the third metallic element, and at least one metal element selected from the group consisting of Sn, Cu, In, Sb and Zn, can be used, for example.

When the third metallic element is Sn, it is desirable that the content of Sn is from about 0.1% to 0.5% by weight of the whole solder composition. When the content of Sn is less than about 0.1% by weight, a solid-liquid coexisting region which is sufficient for avoiding the sudden expansion stress exertion at the solidification cannot be obtained, tending to increase the crack generation rate at the solder solidification, and possibly incurring problems such as lowered bonding strength and lowered properties of electronic parts. On the other hand, when the content of Sn exceeds about 0.5% by weight, a Sn—Bi low melting point binary eutectic (139° C.) is partially generated, incurring lowered solder heat resistance and possibly problems such as solder flowing and coming-off terminals.

When the third metallic element is Cu, it is desirable that the content of Cu is from about 0.1% to 0.3% by weight of the whole solder composition. When the content of Cu is less than about 0.1% by weight, a solid-liquid coexisting region which is sufficient for avoiding the sudden expansion stress exertion at the solidification cannot be obtained, tending to increase the crack generation rate at the solder solidification, and possibly incurring problems such as lowered bonding strength and lowered properties of electronic parts. On the other hand, when the content of Cu exceeds about 0.3% by weight, the liquidus temperature of the solder composition is raised and there is a tendency that more bridging defects, poorer appearance and poorer solderability are caused when the soldering is carried out at the same temperature as that applied to the solder having a smaller amount of Cu. When a higher temperature is selected for the soldering to avoid this problem, the high temperature may damage the properties of electronic parts, etc.

When the third metallic element is In, it is desirable that the content of In is from about 0.1% to 0.5% by weight of the whole solder composition. When the content of In is less than about 0.1% by weight, a solid-liquid coexisting region cannot be obtained which is sufficient for avoiding the sudden expansion stress exertion at the solidification cannot be obtained, tending to increase the crack generation rate at the solder solidification, and possibly incurring problems such as lowered bonding strength and lowered properties of electronic parts. On the other hand, when the content of In exceeds about 0.5% by weight, an In—Bi low melting point binary eutectic (109.5° C.) is partially generated, incurring lowered solder heat resistance and possibly problems such as solder flowing and coming-off terminals.

When the third metallic element is Sb, it is desirable that the content of Sb is from about 0.1% to 3% by weight of the whole solder composition. When the content of Sb is less than 0.1% by weight, a solid-liquid coexisting region cannot be obtained which is sufficient for avoiding the sudden expansion stress exertion at the solidification cannot be obtained, tending to increase the crack generation rate at the solder solidification, and possibly incurring problems such as lowered bonding strength and lowered properties of electronic parts. On the other hand, when the content of Sb exceeds about 3% by weight, the liquidus temperature of the solder composition is raised and there is a tendency that more bridging defects, poorer appearance and poorer solderability are caused when the soldering is carried out at the same temperature as that applied to the solder having a smaller amount of Sb. When a higher temperature is selected for soldering to avoid this problem, the high temperature may incur lowered properties of electronic parts, etc.

When the third metallic element is Zn, it is desirable that the content of Zn is from about 0.1% to 3% by weight of the whole solder composition. When the content of Zn is less than 0.1% by weight, a solid-liquid coexisting region which is sufficient for avoiding the sudden expansion stress exertion at the solidification, cannot be obtained, tending to increase the crack generation rate at the solder solidification, and possibly incurring problems such as lowered bonding strength and lowered properties of electronic parts. On the other hand, when the content of Zn exceeds about 3% by weight, the liquidus temperature of the solder composition is raised and there is a tendency that more bridging defects, poorer appearance and poorer solderability are caused when the soldering is carried out at the same temperature as that applied to the solder having a smaller amount of Zn. When a higher temperature is selected for soldering to avoid this problem, the high temperature may incur lowered properties of electronic parts, etc.

Furthermore, at least one element selected from the group consisting of Ge and P may be further added to the above-described third metallic element. Ge and P contribute to restriction of oxide film formation on the surface of the solder composition, or the like. When the third metallic element comprises Ge and P, the total content of Ge and P is preferably from about 0.01% to 0.1% by weight of the whole solder composition. When the total content of Ge and P is less than about 0.01% by weight, there is a tendency that the oxidation prevention effect of the solder becomes smaller. When the total content of Ge and P exceeds about 0.1% by weight, the liquidus temperature of the solder composition is raised, possibly incurring a poorer workability.

Furthermore, it is preferable that the solder composition according to the present invention does not comprise a low melting point eutectic having a solidus temperature of less than about 200° C. When such a low melting point eutectic is contained in a Pb-free solder composition, the solder heat resistance is decreased, tending to cause solder flow or the like.

It is noted that the solder composition according to the present invention is a solder composition substantially free from Pb. However, it is not meant to exclude the cases in which impurities such as Pb or Na are included inevitably in the solder composition.

Figure 2:
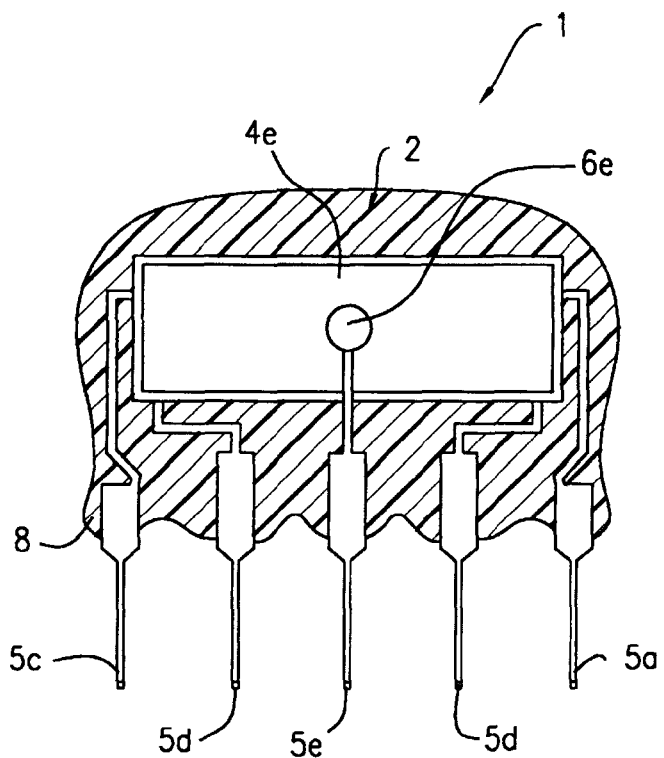

Next, explanations are made on a surface acoustic wave filter as an example of one of the embodiments of a soldered article according to the present invention. The explanations are made based on FIGS. 1 and 2. However, the present invention is not limited thereto or thereby.

A surface acoustic wave filter 1 comprises a substrate 2, a filter part 3, electrode patterns 4a to 4e, lead wires 5a to 5e, solders 6a to 6e, dampers 7a and 7b, and a sealing resin 8.

The substrate 2 is made of a Pyrex® (Coming) glass material, for example. A Pyrex glass has a relatively low thermal impact resistance and the Pb-free solder composition according to the present invention provides an especially outstanding effect when used for the soldering work on to an electrode pattern or the like formed on such a fragile substrate.

The filter part 3 is, for example, equipped with a ZnO film formed by sputtering over comblike Al electrodes, and placed at the center of the surface of the substrate 2. The end positions of the Al electrodes are each electrically connected to the electrode patterns 4a to 4d formed in the vicinities of both the end positions of the substrate 2.

A bottom surface electrode 4e is formed on the bottom surface of the substrate, that is, on one of the main surfaces which is opposite to the one on which the filter 3 is formed.

The lead wires 5a to 5d are composed of, for example, a hot dip Sn—Pb coating and an Fe core and are each electrically connected to the electrode patterns 4a to 4d. The lead wire 5e is electrically connected to the bottom surface electrode 4e.

The solders 6a to 6d are formed with a Pb-free solder composition according to the present invention, and are electrically and mechanically connected to the electrode patterns 4a to 4d as well as to the lead wires 5a to 5d. The solder 6e is also formed with a Pb-free solder composition according to the present invention, and is electrically and mechanically connected to the bottom surface electrode 4e as well as to the lead wire 5e.

The dampers 7a and 7b are made of, for example, a silicone resin or a similar resin, and formed on both the end positions of the filter 3.

A sealing resin 8 is formed, for example, so as to cover the substrate 2 and parts of the lead wires 5a to 5e. Examples of the materials for the resin are an epoxy resin and a silicone resin. However, there is no specific limitation to the materials, and any resin can be used as appropriate, as long as it is excellent in electric insularity, resistance to moisture, impact resistance and heat resistance.

It is noted that the present invention is directed to the whole of a soldered article comprising a substrate having a conductor on the surface, and a Pb-free solder composition according to the present invention placed so as to be electrically and mechanically connected to the conductor. Therefore, it is not necessarily required to have a filter part, a lead wire, a damper or a sealing resin as described in the embodiments above, and the shape and material of the substrate, the number, shape, and material of the conductors, the number of soldering and the shape of the solder composition, etc., are not limited to those of the above-described embodiment.

EXAMPLES

The present invention will be explained based on concrete examples as follows.

First, solder compositions having compositions shown in Examples 1 to 14 and Comparative Examples 1 to 12 in Table 1 were prepared. The melting characteristics (solidus temperature, liquidus temperature, and solid-liquid coexisting region) of the solder compositions of Examples 1 to 14 and Comparative Examples 1 to 12 were measured and are listed in Table 1.

The measurements of the melting characteristics were carried out by putting the molten solder compositions of Examples 1 to 14 and Comparative Examples 1 to 12 dropwise into glycerol to allow rapid cooling and solidification, and by subjecting the samples each cut to 30±10 mg and held in a columnar aluminum pan, to measurements according to a heat flux Differential Scanning Calorimetry (DSC), using ThermoFlexDSC 8230 (product of RIGAKU). The DSC evaluation conditions were as follows: the measurement temperature range was from ambient temperature to 500° C.; the measurement was carried out in an $N_2$ atmosphere; $Al_2O_3$ was used as the reference; and the sampling interval was 1 second. The programming rate for raising the temperature was kept at 5° C./min, while monitoring the change of heat quantity (endothermic change) in the course of the temperature rise in order to avoid supercooling. Based on the profile thus obtained, the starting point of the endothermic reaction was determined as the solidus temperature, and the ending point of the endothermic reaction was determined as the liquidus temperature. When a feeble symptom of an endothermic reaction accompanied by the generation of a low melting point eutectic was detected as were observed in the multi-component cases containing Sn or In, the starting point of the endothermic reaction was interpreted as the solidus temperature. Furthermore, the difference between the liquidus temperature and the solidus temperature was determined as the solid-liquid coexisting region.

TABLE 1

| Sample | | Bi | Ag | Sn | Cu | Sb | In | Zn | Ge | P | Solidus Temperature | Liquidus Temperature | Solid-liquid Coexisting Region |
|---|---|---|---|---|---|---|---|---|---|---|---|---|---|
| | | | | Solder Composition (wt. %) | | | | | | | Melting Characteristics (° C.) | | |
| Example | 1 | 97.40 | 2.50 | 0.10 | | | | | | | 259 | 271 | 12 |
| | 2 | 97.00 | 2.50 | 0.50 | | | | | | | 255 | 272 | 17 |
| | 3 | 97.40 | 2.50 | | 0.10 | | | | | | 257 | 270 | 13 |
| | 4 | 97.20 | 2.50 | | 0.30 | | | | | | 258 | 313 | 55 |
| | 5 | 97.40 | 2.50 | | | 0.10 | | | | | 263 | 280 | 17 |
| | 6 | 94.50 | 2.50 | | | 3.00 | | | | | 264 | 318 | 54 |
| | 7 | 97.40 | 2.50 | | | | 0.10 | | | | 260 | 271 | 11 |
| | 8 | 97.00 | 2.50 | | | | 0.50 | | | | 255 | 272 | 17 |
| | 9 | 97.40 | 2.50 | | | | | 0.10 | | | 261 | 272 | 11 |
| | 10 | 94.50 | 2.50 | | | | | 3.00 | | | 256 | 277 | 21 |
| | 11 | 99.55 | | 0.30 | 0.15 | | | | | | 257 | 277 | 20 |
| | 12 | 96.80 | | 0.50 | | | | 2.70 | | | 245 | 263 | 18 |
| | 13 | 96.99 | 2.50 | 0.50 | | | | | 0.01 | | 255 | 275 | 20 |
| | 14 | 96.99 | 2.50 | 0.50 | | | | | | 0.01 | 255 | 277 | 22 |
| Comparative Example | 1 | | | 60.00 | | | | | | | 181 | 190 | 9 |
| | 2 | | | 50.00 | | | | | | | 183 | 219 | 36 |
| | 3 | | 3.50 | 96.50 | | | | | | | 221 | 226 | 5 |
| | 4 | | 3.50 | 95.75 | 0.75 | | | | | | 217 | 226 | 9 |
| | 5 | 97.50 | 2.50 | | | | | | | | 264 | 270 | 6 |
| | 6 | 96.50 | 2.50 | 1.00 | | | | | | | 137* | 247 | 110 |
| | 7 | 97.00 | 2.50 | | 0.50 | | | | | | 257 | 366 | 109 |
| | 8 | 92.50 | 2.50 | | | 5.00 | | | | | 264 | 348 | 84 |
| | 9 | 96.50 | 2.50 | | | | 1.00 | | | | 108* | 271 | 163 |
| | 10 | 92.50 | 2.50 | | | | | 5.00 | | | 255 | 280 | 25 |
| | 11 | 99.85 | | | 0.15 | | | | | | 272 | 278 | 6 |
| | 12 | 97.30 | | | | | | 2.70 | | | 256 | 262 | 6 |

*Low melting point eutectic generated.

Next, sputtering was carried out with Al, Ni and Ag each to form a thickness of 4,000 Å on both main surfaces of a Pyrex glass substrate so that three-layered, 2 mm□ (square) electrode patterns were formed with a gap of 1 mm therebetween. There were two electrode patterns on each main surface. These electrode patterns were joined to hot dip Sn coating/Fe-core lead wires (1.5 mm×0.2 mm×20 mm), respectively. While holding them, the Pyrex glass substrate was immersed into a flux (H-52; made by Tamura Manufacturing Co., Ltd.), and then immersed into solder compositions of Examples 1 to 14 or Comparative Examples 1 to 12. After that, they were washed with acetone to provide soldered articles numbering 100 for each of Examples 1 to 14 and Comparative Examples 1 to 12. The soldering conditions were: 280° C. for the soldering temperature; 2 seconds for the immersion time; 5 mm for the immersion depth; and 10 mm/sec for the immersion speed.

The crack generation rates, bridging defect generation rates and solder heat resistance-related defect generation rates were measured for the soldered articles of Examples 1 to 14 and Comparative Examples 1 to 12. They are summarized in Table 2.

The crack generation rates were determined by observing the soldered articles of Examples 1 to 14 and Comparative Examples 1 to 12 in the direction of the cross-sections of the Pyrex glass substrate under a light microscope, and were determined as the rate per 100 or the whole number of articles for each Example.

The bridging defect generation rates were determined by observing, with the naked eye, the number of bridged pairs of electrode patterns formed on each surface of the Pyrex glass substrates of the soldered articles of Examples 1 to 14 and Comparative Examples 1 to 12, and were determined as the rate per 100 or the whole number of articles for each Example.

The solder heat resistance-related defect generation rates were determined by observing, with the naked eye, the cases in which solder flowing or coming-off lead wires were observed at the stage of reflow-heating the soldered articles of Examples 1 to 14 and Comparative Examples 1 to 12 at a temperature range with a peak temperature of 250° C., and were determined as the rate per 100 or the whole number of articles for each Example.

TABLE 2

| Sample | Crack Generation Rate (%) | Bridging Defect Generation Rate (%) | Solder Heat Resistance-Related Defect Generation Rate (%) |
|---|---|---|---|
| Example | | | |
| 1 | 0.1 | 0.0 | 0.0 |
| 2 | 0.0 | 0.0 | 0.0 |
| 3 | 0.1 | 0.0 | 0.0 |
| 4 | 0.0 | 0.0 | 0.0 |
| 5 | 0.1 | 0.0 | 0.0 |
| 6 | 0.0 | 0.0 | 0.0 |
| 7 | 0.1 | 0.5 | 0.0 |
| 8 | 0.0 | 0.9 | 0.0 |
| 9 | 0.1 | 1.0 | 0.0 |
| 10 | 0.0 | 3.2 | 0.0 |
| 11 | 0.0 | 0.0 | 0.0 |
| 12 | 0.0 | 9.5 | 0.0 |
| 13 | 0.0 | 0.0 | 0.0 |
| 14 | 0.0 | 0.0 | 0.0 |
| Comparative Example | | | |
| 1 | 1.5 | 0.0 | 100.0 |
| 2 | 0.0 | 0.0 | 100.0 |
| 3 | 100.0 | 0.0 | 100.0 |
| 4 | 20.3 | 0.0 | 100.0 |

TABLE 2-continued

| Sample | Crack Generation Rate (%) | Bridging Defect Generation Rate (%) | Solder Heat Resistance-Related Defect Generation Rate (%) |
|---|---|---|---|
| 5 | 0.5 | 0.0 | 0.0 |
| 6 | 0.0 | 0.0 | 100.0 |
| 7 | 0.0 | 100.0 | 0.0 |
| 8 | 0.0 | 100.0 | 0.0 |
| 9 | 0.0 | 23.0 | 100.0 |
| 10 | 0.0 | 100.0 | 0.0 |
| 11 | 0.4 | 0.0 | 0.0 |
| 12 | 0.8 | 9.8 | 0.0 |

As is evident from Table 2, all of the soldered articles of Examples 1 to 14 have crack generation rates in the range of from 0% to 0.1%, showing that they had excellent resistance to crack generation. In particular, the soldered articles of Examples 2, 4, 6, 8, and 10 to 14 had crack generation rates of 0%, showing that they had especially excellent resistance to crack generation.

Specifically, soldered articles from the Bi—Ag—Sn solder compositions of Examples 1 and 2 comprising 2.5% by weight of Ag as the second metallic element and 0.1% and 0.5% by weight of Sn as the third metallic element, the Bi—Ag—Cu solder compositions of Examples 3 and 4 comprising the same contents of Ag as above and 0.1% and 0.3% by weight of Cu as the third metallic element, the Bi—Ag—Sb solder compositions of Examples 5 and 6 comprising the same contents of Ag as above and 0.1% and 3.0% by weight of Sb as the third metallic element, the Bi—Ag—In solder compositions of Examples 7 and 8 comprising the same contents of Ag as above and 0.1% and 0.5% by weight of In as the third metallic element, and the Bi—Ag—Zn solder compositions of Examples 9 and 10 comprising the same contents of Ag as above and 0.1% and 3.0% by weight of Zn as the third metallic element, were all excellent with low crack generation rates of from 0% to 0.1% and solder heat resistance-related defect generation rates of 0%.

While all of these solder compositions had 2.5% by weight of Ag as the second metallic element, the soldered article using a Bi—Ag eutectic solder composition of Comparative Example 5 which did not comprise a third metallic element, had a crack generation rate of 0.5%. From this, it is understood that addition of the third metallic element expands the solid-liquid coexisting region, decreasing the crack generation rate. It is also understood that the more of the third metallic element which is added, the wider that the solid-liquid coexisting region is expanded and the lower becomes the crack generation rate.

In the cases of the soldered articles of Examples 7 to 10, the bridging defect generation rates were in the range of from 0.5% to 3.2%. These soldered articles comprised In or Zn, suggesting that the bridging defects were generated since they were easily oxidized. These solder compositions are applicable to a location with a relatively wide gap where the bridging problem is not considered to occur.

The soldered article using the Bi—Cu—Sn solder composition of Example 11 comprising 0.15% by weight of Cu as the second metallic element and 0.3% by weight of Sn as the third metallic element was also excellent, showing as low a value as 0% for the crack generation rate, bridging defect generation rate and solder heat resistance-related defect generation rate.

Also, the soldered article using the Bi—Zn—Sn solder composition of Example 12 comprising 2.7% by weight of Zn as the second metallic element and 0.5% by weight of Sn as the third metallic element was excellent, showing as low a value as 0% for the crack generation rate and for the solder heat resistance-related defect generation rate. However, the bridging defect generation rate was 9.5% when this composition was used, while the rate was 9.8% for the soldered article using the Bi—Zn eutectic solder composition of Comparative Example 12 which did not comprise a third metallic element. From this, it is understood that addition of the third metallic element expands the solid-liquid coexisting region, decreasing the bridging defect generation rate.

Also, the soldered articles using the Bi—Ag—Sn—Ge and Bi—Ag—Sn—P solder compositions of Examples 13 and 14 comprising 2.5% by weight of Ag as the second metallic element, 0.5% by weight of Sn as the third metallic element as well as 0.01% by weight of Ge or P as an antioxidant were excellent, showing all as low a value as 0% for the crack generation rate, bridging defect generation rate and solder heat resistance-related defect generation rate.

In comparison, the soldered articles using solder compositions comprising 2.5% by weight of Ag as the second metallic element and third metallic elements at contents exceeding a specified amount, more specifically, using the Bi—Ag—Sn solder composition of Comparative Example 6 comprising 1.0% by weight (that is, more than about 0.5% by weight) of Sn as the third element, the Bi—Ag—Cu solder composition of Comparative Example 7 comprising 0.5% by weight (that is, more than about 0.3% by weight) of Cu, the Bi—Ag—Sb solder composition of Comparative Example 8 comprising 5.0% by weight (that is, more than about 3.0% by weight) of Sb, the Bi—Ag—In solder composition of Comparative Example 9 comprising 1.0% by weight (that is, more than about 0.5% by weight) of In, the Bi—Ag—Zn solder composition of Comparative Example 10 comprising 5.0% by weight (that is, more than about 3.0% by weight) of Zn, showed crack generation rates of 0%. In the solder compositions of Comparative Examples 6 and 9, low melting point eutectics were partially generated which had solidus temperatures in the range of from 108 to 137° C., and thus the generation rates of the solder heat resistance-related defects such as solder flowing, coming-off terminals, etc. were both 100%. Also the solder compositions of Comparative Examples 7, 8 and 10 had raised liquidus temperatures, and thus the bridging defect generation rates were all 100%.

Furthermore, the soldered articles using the Sn—Ag solder composition of Comparative Example 3 comprising 3.5% by weight of Ag, the Sn—Ag—Cu solder composition of Comparative Example 4 comprising 3.5% by weight of Ag and 0.75% by weight of Cu, the Bi—Ag eutectic solder composition of Comparative Example 5 which comprised 2.5% by weight of Ag but did not comprise a third metallic element, the Bi—Cu solder composition of Comparative Example 11 comprising 0.15% by weight of Cu, and the Bi—Zn solder composition of Comparative Example 12 comprising 2.7% by weight of Zn, gave high crack generation rates in the range of from 0.4% to 100%, since the solid-liquid coexisting regions of these compositions were as narrow as from 6 to 9° C.

Furthermore, the soldered articles using the conventional Sn—Pb type solder compositions of Comparative Examples 1 and 2, melted completely under the reflow heating which had a peak temperature of 250° C. and the generation rates of the solder heat resistance-related defects such as solder flowing, coming-off terminals, etc. were both 100% since the solidus temperatures of the compositions were as low as 230° C. or less.

As described above, the Pb-free solder composition according to the present invention comprises Bi as a first metallic element; a second metallic element which can form a binary eutectic at a ratio of not more than about 9.9 parts by weight of the second metallic element based on not less than about 90 parts by weight of the first metallic element; and a third metallic element, wherein the first metallic element is not less than about 90% by weight, and the third metallic element is from about 0.1% to 3.0% by weight, both based on the whole solder composition, and therefore the present invention can provide a Pb-free solder composition which has an excellent heat resistance and which does not damage a fragile substrate such as a glass substrate even when the soldering with the composition is carried out on to an electrode pattern formed on the substrate, and provide a Pb-free soldered article therewith.

What is claimed is:

1. A solder composition which is Pb-free and comprises:
   at least about 90% by weight of Bi as a first metallic element;
   an amount of not more than about 9.9% by weight of a second metallic element which forms a binary eutectic with said first metallic element selected from the group consisting of Ag, Cu and Zn; and
   about 0.1% to 3.0% by weight of a third metallic element which causes a solid and liquid to coexist at about the solidification temperature of said eutectic;
   wherein all percents by weight are based on the whole solder composition, and
   wherein said solder composition does not contain a low melting-point eutectic with a solidus temperature of less than about 200° C.

2. A solder composition which is Pb-free and comprises:
   at least about 90% by weight of Bi as a first metallic element;
   an amount of not more than about 9.9% by weight of at least one of Ag, Cu and Zn as a second metallic element; and
   about 0.1% to 3.0% by weight of at least one of Sn, Cu, In, Sb and Zn.

3. A Pb-free solder composition according to claim 2, wherein said second metallic element is at least 0.1% by weight of said whole solder composition.

4. A Pb-free solder composition according to claim 3, wherein said second metallic element is Ag, and said third metallic element is at least one member selected from the group consisting of about 0.1% to 0.5% by weight of Sn, about 0.1% to 0.3% by weight of Cu, about 0.1% to 0.5% by weight of In, about 0.1% to 3.0% by weight of Sb, and about 0.1% to 3.0% by weight of Zn.

5. A Pb-free solder composition according to claim 4, wherein said third metallic element further comprises at least one element selected from the group consisting of Ge and P.

6. A Pb-free solder composition according to claim 5, wherein the amount of Ge and P is about 0.01% to 0.1% by weight of said whole solder composition.

7. A Pb-free solder composition according to claim 6, wherein said first metallic element is at least about 94.5% by weight and said second metallic element is about 0.15% to 3.0% by weight, based on said whole solder composition.

8. A Pb-free solder composition according to claim 1, wherein said third metallic element is at least one element selected from the group consisting of Sn, Cu, In, Sb and Zn.

9. A Pb-free solder composition according to claim 1, wherein said third metallic element further comprises at least one element selected from the group consisting of Ge and P.

10. A Pb-free solder composition according to claim 9, wherein the amount of Ge and P is about 0.01% to 0.1% by weight of said whole solder composition.

11. A Pb-free solder composition according to claim 1, wherein said first metallic element is at least about 94.5% by weight and said second metallic element is about 0.15% to 3.0% by weight, based on said whole solder composition.

12. A Pb-free soldered article comprising
   a glass substrate having an electrode pattern on the surface;
   a Pb-free solder composition according to claim 7 electrically and mechanically connected to said conductive pattern; and
   a lead wire connected to said electrode via said Pb-free solder composition.

13. A Pb-free soldered article comprising:
   a substrate having a conductive pattern on the surface; and
   a Pb-free solder composition according to claim 3 electrically and mechanically connected to said conductive pattern.

14. A Pb-free soldered article according to claim 13, wherein said substrate is a glass substrate having an electrode pattern on the surface; and
   a lead wire connected to said electrode via said Pb-free solder composition.

15. A Pb-free soldered article comprising:
   a substrate having a conductive pattern on the surface; and
   a Pb-free solder composition according to claim 1 electrically and mechanically connected to said conductive pattern.

16. A Pb-free soldered article according to claim 15, wherein
   said substrate is a glass substrate having an electrode pattern on the surface;
   and a lead wire connected to said electrode via said Pb-free solder composition.

17. A solder composition which is Pb-free and comprises:
   at least about 90% by weight of Bi as a first metallic element;
   an amount of not more than about 9.9% by weight of at least one of Ag and Cu as a second metallic element; and
   about 0.1% to 3.0% by weight of at least one of Sn, In, Sb and Zn.

18. A solder composition which is Pb-free and comprises:
   at least about 90% by weight of Bi as a first metallic element;
   an amount of not more than about 9.9% by weight of Ag as a second metallic element; and
   at least one member, as a third metallic element, selected from the group consisting of about 0.1% to 0.5% by weight of Sn, about 0.1% to 0.3% by weight of Cu, about 0.1% to 0.5% by weight of In, about 0.1% to 3.0% by weight of Sb, and about 0.1% to 3.0% by weight of Zn.

* * * * *